(12) United States Patent
Arunachalam et al.

(10) Patent No.: US 11,934,840 B2
(45) Date of Patent: Mar. 19, 2024

(54) CLASSIFICATION OF HARDWARE COMPONENTS

(71) Applicant: Hewlett Packard Enterprise Development LP, Houston, TX (US)

(72) Inventors: Somasundaram Arunachalam, Karnataka (IN); Debdipta Ghosh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 249 days.

(21) Appl. No.: 17/231,554

(22) Filed: Apr. 15, 2021

(65) Prior Publication Data

US 2022/0197665 A1 Jun. 23, 2022

(30) Foreign Application Priority Data

Dec. 17, 2020 (IN) .................. IN 202041055071

(51) Int. Cl.
*G06F 15/177* (2006.01)
*G06F 9/4401* (2018.01)
*G06F 9/50* (2006.01)
*G06F 18/214* (2023.01)
*G06N 7/01* (2023.01)

(52) U.S. Cl.
CPC .......... *G06F 9/4403* (2013.01); *G06F 9/4411* (2013.01); *G06F 9/5044* (2013.01); *G06F 18/214* (2023.01); *G06N 7/01* (2023.01); *G06F 9/4406* (2013.01)

(58) Field of Classification Search
CPC .... G06F 9/4403; G06F 9/4411; G06F 9/5044; G06F 18/214; G06F 8/65; G06N 7/01; G06N 3/08

USPC ............................................. 713/2
See application file for complete search history.

(56) References Cited

U.S. PATENT DOCUMENTS

| 7,802,084 | B2 * | 9/2010 | Fitzgerald | G06F 8/63 |
| | | | | 713/1 |
| 8,352,722 | B2 | 1/2013 | Shah et al. | |
| 11,354,120 | B1 * | 6/2022 | Zhang | G06F 8/72 |
| 2005/0228789 | A1 * | 10/2005 | Fawcett | G06N 20/00 |
| 2009/0106753 | A1 * | 4/2009 | Wang | G06F 8/60 |
| | | | | 717/176 |

(Continued)

OTHER PUBLICATIONS

DMTF, "System Management BIOS (SMBIOS) Reference Specification", Document No. DSP0134, Version: 2.7.1 , Jan. 26, 2011, 136 pages.

(Continued)

*Primary Examiner* — Volvick Derose
(74) *Attorney, Agent, or Firm* — Trop, Pruner & Hu, P.C.

(57) ABSTRACT

Approaches for classifying hardware components of a computing device using a classification system are described. In an example, by the classification system, a hardware configuration information of the computing device installed within a networked environment is obtained. The hardware configuration information may thus be processed based on a system classification model. The system classification model is to classify hardware components of the computing device as one of a plurality of hardware types. Once the hardware components are classified, a category of the computing device is determined. Based on the determined category, a target system software is identified and installed onto the computing device.

20 Claims, 8 Drawing Sheets

(56) References Cited

U.S. PATENT DOCUMENTS

| | | | |
|---|---|---|---|
| 2009/0265701 A1* | 10/2009 | Naslavsky | G06F 8/61 |
| | | | 717/172 |
| 2013/0117358 A1* | 5/2013 | Ricard | H04L 67/01 |
| | | | 709/203 |
| 2014/0180738 A1* | 6/2014 | Phillipps | G06N 20/10 |
| | | | 705/7.38 |
| 2016/0275288 A1* | 9/2016 | Sethumadhavan | H04L 9/3239 |
| 2016/0275289 A1* | 9/2016 | Sethumadhavan | |
| | | | H04L 63/0428 |
| 2019/0020540 A1* | 1/2019 | Yen | H04L 41/0893 |
| 2019/0268241 A1* | 8/2019 | Bifulco | G06F 9/5027 |
| 2019/0319859 A1* | 10/2019 | Casey | H04L 63/1408 |
| 2020/0012955 A1* | 1/2020 | Miyata | G06N 5/04 |
| 2020/0128104 A1* | 4/2020 | Bitterfeld | H04L 67/06 |
| 2020/0151619 A1* | 5/2020 | Mopur | H04L 67/12 |
| 2020/0153703 A1* | 5/2020 | Peterkin | G06F 8/60 |
| 2020/0310851 A1* | 10/2020 | Featonby | G06F 9/5027 |
| 2021/0103828 A1* | 4/2021 | Bitterfeld | H04L 41/0853 |
| 2021/0200827 A1* | 7/2021 | Sridharan | G06F 16/9537 |
| 2021/0224491 A1* | 7/2021 | Kim | G06N 3/04 |
| 2021/0248105 A1* | 8/2021 | Gentile | G06N 5/022 |
| 2022/0019935 A1* | 1/2022 | Ghatage | G06F 11/3065 |
| 2022/0035679 A1* | 2/2022 | Sunwoo | G06N 5/04 |
| 2022/0137985 A1* | 5/2022 | Murugan | G06F 8/65 |
| | | | 713/100 |
| 2023/0026057 A1* | 1/2023 | Ghosh | G06F 8/65 |
| 2023/0035575 A1* | 2/2023 | Katsuhara | G06N 5/022 |
| 2023/0042890 A1* | 2/2023 | Wen | G06F 9/5083 |

OTHER PUBLICATIONS

The TCP/IP Guide, "Summary of DHCP Options / BOOTP Vendor Information Fields", available online at <http://www.tcpipguide.com/free/t_SummaryOfDHCPOptionsBOOTPVendorInformationFields-6.htm>, 2005, 3 pages.

Wikipedia, "Directed Acyclic Graph", available online at <https://en.wikipedia.org/w/index.php?title=Directed_acyclic_graph&oldid=984115546>, Oct. 18, 2020, 13 pages.

Wikipedia, "Hierarchical classification", available online at <https://en.wikipedia.org/wiki/Hierarchical_classification>, Apr. 27, 2020, 2 pages.

Smbios (Webpage), Retrieved Oct. 9, 2020, 1 Pg.

* cited by examiner

CLASSIFICATION OF HARDWARE COMPONENTS

BACKGROUND

Computing devices such as a desktop PC (Personal Computer), laptops, routers, switches, and storage systems may include several operation-specific hardware components. Such computing devices typically have different hardware configuration information and may need to go through an initial setup process before such devices may be made operational in a networked computing environment, such as a data center. The initial setup process, for example, may involve installing the appropriate operating system and application on the device based on its hardware components. Examples of such hardware components include, but are not limited to, microprocessor, RAM (Random Access Memory), interface cards, and graphical processing unit.

BRIEF DESCRIPTION OF FIGURES

Systems and/or methods, in accordance with examples of the present subject matter are now described and with reference to the accompanying figures, in which.

DETAILED DESCRIPTION

Figure 1:
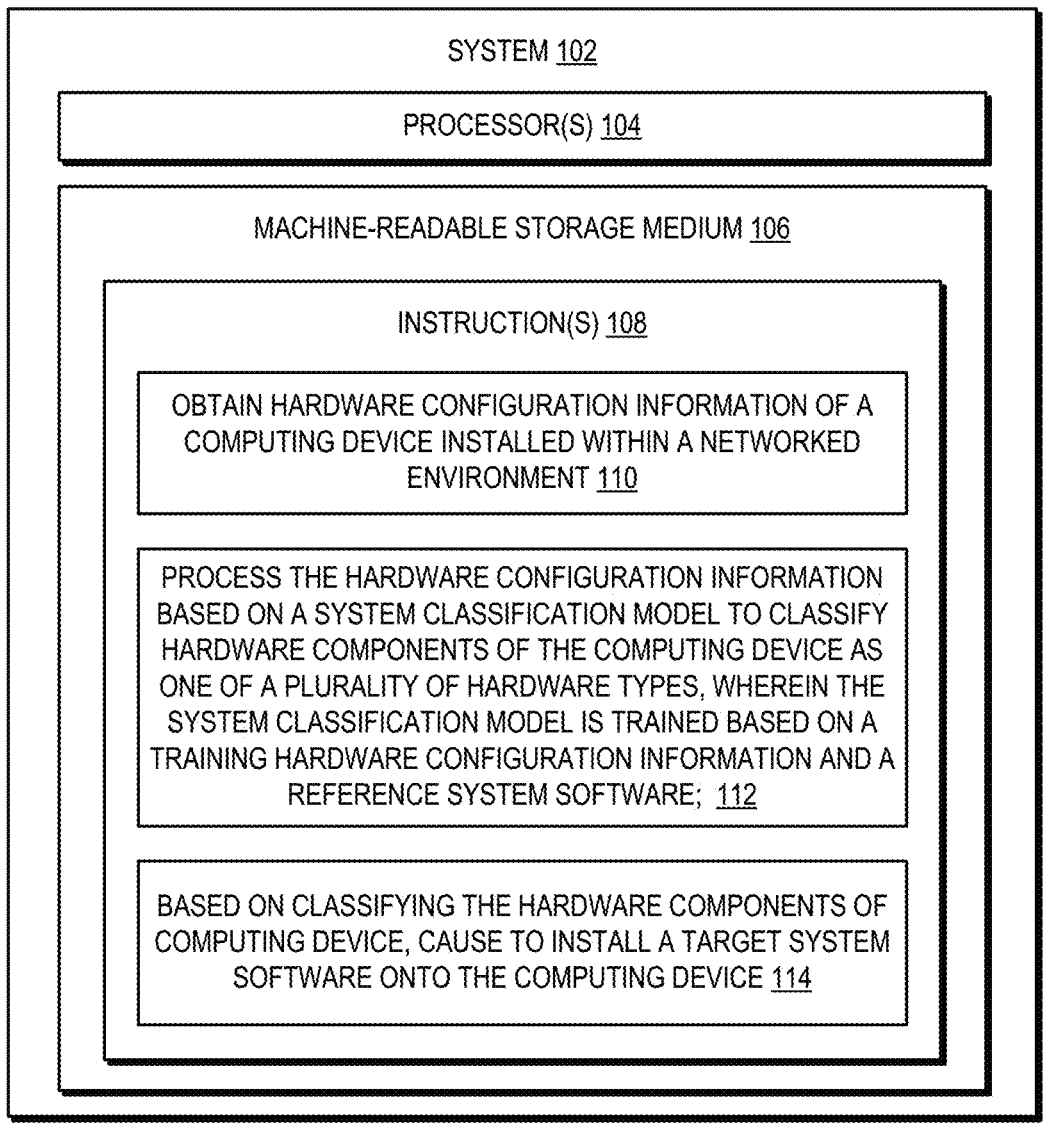
FIG. 1 illustrates a computing system for classifying hardware components of a computing device, as per an example.

A networked environment of interconnected computing devices, such as a data centre, may be utilized for storing, managing, disseminating data and for providing a variety of services. The functioning of such networked environments may be enabled through the use of a variety of hardware devices, such as routers, switches, firewalls, storage systems, servers, application-delivery controllers and many more.

In instances where the networked environment is to undergo expansion or upgrading, either in terms of storage or processing resources, additional computing devices may be deployed within the network. For deploying such computing devices, the same may be installed within the network. This in turn may involve obtaining the corresponding software drivers, operating system, or such system software, and installing the system software onto the computing device. In the context of the present example, a variety of computing devices are being installed, deployment within the networked environment may further involve determining the type of computing device, and thereafter identifying and retrieving the corresponding system software for installation.

In certain situations, premises within which the installation is to be done, may be large. As a result, installation may involve covering considerable distances within the premises for installing the computing devices. The system software may then be installed using a certain standardized client-server environment that boots a system software assembly, retrieved from a network location. An example of such an environment includes, but is not limited to, Preboot eXecution Environment (PXE). However, such a process to be implemented for a large number of computing devices will likely take an inordinate amount of time, and hence is inefficient.

Approaches for identifying and installing a system software onto a target computing device based on a hardware configuration information of such a computing device, are described. The target computing device may be a device which is to be deployed within a networked environment. In one example, hardware configuration information of the target computing device which is to be installed within a networked environment, is obtained. The hardware configuration information may include attribute values corresponding to the hardware components of the computing device. Examples of such attribute values include, but are not limited to, number of processor cores, memory size, and number of network ports. Such information may be obtained directly from the computing device or any other intermediate entity which may have obtained such information.

Once obtained, the hardware configuration information may be processed based on a system classification model. The system classification model may be used to classify hardware components of the computing device as one of a plurality of hardware types. Based on the classification of the hardware component, a category of the computing device (i.e., the target computing device which is to be installed) may be determined. Once the category of the computing device is determined, a corresponding target system software may be identified. Accordingly, the identified target system software may be installed on the computing device. For example, if the computing device is determined to be an enterprise medium memory segment server, the appropriate operating system may accordingly be determined which may thereafter be installed on the computing device.

In an example, the system classification model may be a machine learning model which is trained based on a set of training hardware configuration information and a corresponding reference system software. The training hardware configuration information may include a plurality of attribute values of hardware components of certain reference computing devices which may have been previously installed within the network. In an example, the attributes may include motherboard type, system enclosure type, processor type, memory controller type, system slot type, on-board device type, pointing device type, power source type, cooling device type, management device type, or various combinations thereof.

The training hardware configuration information in turn is associated with a reference system software. The reference system software represents a system software that may be installed in the corresponding reference computing device for which the hardware configuration information is obtained. A system software may be considered as any processor executable code, which when executed, enable the operation of the hardware components and the applications installed on any given computing device. Examples of system software include, but is not limited to, operating system, drivers and certain application software. Other types of system software may also be utilized without deviating from the scope of the present subject matter.

As will be explained further, the present approaches enable identification of the category of the target computing device which has been installed within the network based on the system classification model. Since the system classification model is trained based on the attribute values of hardware components of a reference computing device and a corresponding reference system software installed, a type or category of target computing device may be determined based on information pertaining to their constituent hardware components. With the category of the computing device determined, the appropriate software system may be determined and installed on the target computing device. These and other approaches are further explained in conjunction with the accompanying figures.

FIG. 1 illustrates an example system 102 for classifying hardware components of a computing device of a networked environment. The classification is based on a hardware configuration information of such a computing device, in accordance with an example of the present subject matter. The system 102 includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to classify the hardware components of the computing device.

In an example, the processor 104 may fetch and execute instructions 108. In one example, as a result of the execution of the instructions 110, the system 102 may obtain hardware configuration information of a computing device installed within a networked environment. The computing device may be a device which has been introduced within the networked environment and is to be made operational. The computing device may further include a plurality of hardware components. In an example, the hardware configuration information may include attribute values of the constituent hardware components of the computing device. Examples of such attribute values may include, but are not limited to, processor cores, processor speed, memory size, number of network ports and many more. The hardware configuration information may be obtained directly from the computing device or any other intermediate repository where such information may have been stored.

Once obtained, the hardware configuration information may be processed to classify hardware components of the computing device as one of a plurality of hardware types. The classification may be performed as a result of the execution of the instructions 112. In an example, the classification of the hardware components is based on a system classification model. The system classification model may be a machine learning model which is trained based on training hardware configuration information (referred to as training information) and a corresponding reference system software. The training information, in one example, include attribute values of hardware components of a reference computing device having the reference system software installed thereupon.

Once the different hardware components of the computing device are classified, the instructions 114 may be executed to identify and install a target system software onto the computing device. Different categories of computing devices may have different combinations of hardware components. To this end, based on the classification of the hardware components, a category of the computing device may be estimated.

As described previously, the system classification model is trained based on the training information and corresponding reference system software. Once the category of the computing device is estimated, the appropriate system software for the computing device may also be determined based on the system classification model.

The above functionalities performed as a result of the execution of the instructions 108, may be performed by different programmable entities. Such programmable entities may be implemented through neural network-based computing systems, which may be implemented either on a single computing device, or multiple computing devices. As will be explained, various examples of the present subject matter are described in the context of a computing system for training a neural network-based model, and thereafter, utilizing the neural network model for classifying the hardware components of the computing device by using its hardware configuration information based on a classification model. These and other examples are further described with respect to other figures.

Figure 2:
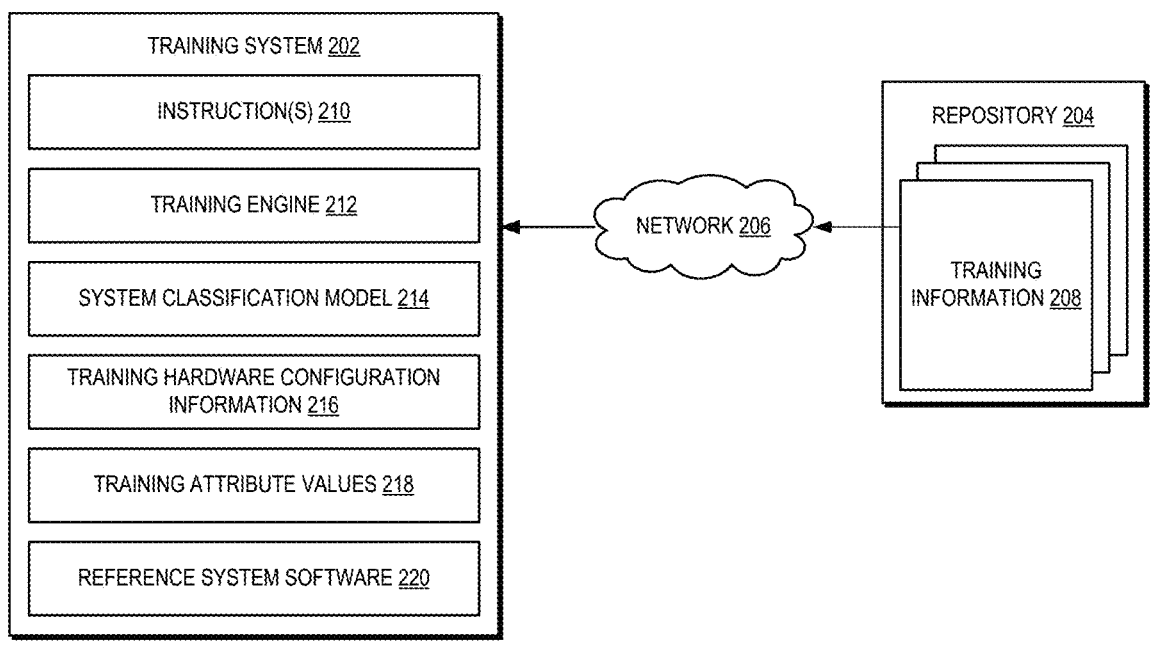
FIG. 2 illustrates a computing system for training a system classification model, as per another example.

FIG. 2 illustrates a training system 202 comprising a processor or memory (not shown), for training a system classification model. In an example, the training system 202 (referred to as system 202) may be communicatively coupled to a repository 204 through a network 206. The repository 204 may further include training hardware configuration information 208 (referred to as training information 208). As also described in conjunction with FIG. 1, the training information 208 may include attribute values of hardware components of a reference computing device having the reference system software installed there upon. In an example, the attribute values may include motherboard type, system enclosure type, processor type, memory controller type, system slot, on-board device type, pointing device type, power source type, cooling device type, management device type, or various combinations thereof. The training information 208, although depicted as being obtained from a single repository, such as repository 204, may also be obtained from multiple other sources without deviating from the scope of the present subject matter. In such cases, each of such multiple repositories may be interconnected through a network, such as the network 206.

The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The system 202 may further include instructions 210 and a training engine 212. In an example, the instructions 210 are fetched from a memory and executed by a processor included within the system 202. The training engine 212 may be implemented as a combination of hardware and programming, for example, programmable instructions to implement a variety of functionalities. In examples described herein, such combinations of hardware and programming may be implemented in several different ways. For example, the programming for the training engine 212 may be executable instructions, such as instructions 210. Such instructions may be stored on a non-transitory machine-readable storage medium which may be coupled either directly with the system 202 or indirectly (for example, through networked means). In an example, the training engine 212 may include a processing resource, for example, either a single processor or a combination of multiple processors, to execute such instructions. In the present examples, the non-transitory machine-readable storage medium may store instructions, such as instructions 210, that when executed by the processing resource, implement training engine 212. In other examples, the training engine 212 may be implemented as electronic circuitry.

The instructions 210 when executed by the processing resource, cause the training engine 212 to train a system classification model, such as a system classification model 214. The instructions 210 may be executed by the processing resource for training the system classification model 214 based on the training information 208. The system 202 may further include a training hardware configuration information 216, a training attribute values 218, and a reference system software 220. In an example, the system 202 may obtain single training information 208 at one time which may be corresponding to a single reference computing device from the repository 204, and the information pertaining to that is stored as training hardware configuration information 216, training attribute values 218, and a reference system software 220.

In one example, the training information 208 may further include training attribute values 218. For training, the attribute values, such as training attribute values 218, of the training information 208 may be used to train the system classification model 214. The system classification model 214 may then be used to classify hardware components of a reference computing device as one of a plurality of hardware type. Example of hardware components include, but may not be limited to, motherboard, system enclosure, processor cores, memory, system slot, on-board device, pointing device, power source, cooling device, and management device. The attribute values, such as training attribute values 218, corresponding to the hardware components of the reference computing device may include, processor speed, main server chassis, vendor name, memory size, IO (Input-Output) riser card, SATA (Serial AT Attachment) controller, mouse, power source size, and fan. It may be noted that, above disclosed training attribute values 218 is exemplary, it may take distinct information based on the type of the hardware components of the reference computing device.

In another example, the system 202 may obtain training information 208 from a centralized server in a client-server environment, such as a Preboot eXecution Environment (PXE). The training information 208 in the PXE server may be stored as a SMBIOS specifications. The SMBIOS specification may include information in form of a data structure whereby listing attribute values of hardware components of a reference computing device. Such SMBIOS specification may be obtained during hardware initialization of the computing device under consideration.

The attribute values, such as training attribute values 218, once obtained from the SMBIOS specification may be categorized in groups based on device specific criterion. For example, the training attribute values 218 may be categorized based on vendor, type, or size, of the reference computing device to form the training information 208. Indicative example of categorized attribute values, such as training attribute values 218 is listed below, as per one example, in Table 1. Table 1 depicts the different sets of hardware components and the denomination allocated to attribute values of different types of hardware components within each set of hardware components. The below table depicts an exemplary categorization of hardware components and is not to be construed as limiting the scope of the present subject matter.

TABLE 1

| CPU | RAM | NIC | GPU |
| --- | --- | --- | --- |
| CPU{32, 256} = C{L} | RAM{256 GB, 2 TB} = R{L} | NIC{4Port} = N{M} | GPU{1, 4} = G{L} |
| CPU{4, 32} = C{M} | RAM{8 GB, 256 GB} = R{M} | NIC{1Port} = N{S} | |
| CPU{1, 4} = C{S} | RAM{128 MB, 8 GB} = R{S} | NIC{22Port} = N{L} | |

As depicted in Table 1, the hardware components within each set of hardware components, i.e., CPU, RAM, NIC (Network Interface Card) and GPU, have been categorized based on the values of the attribute values, such as training attribute values 218, corresponding to the hardware components based on the SM BIOS table. Referring to the example as depicted in Table 1, the processing unit includes three categories (denoted by L, M, and S) of the processing unit of a reference computing device. For example, 'L' denomination is allocated to processing unit having cores between 32 and 256. In a similar manner, set of memory includes three categories (denoted by L, M, and S) of the memory of the reference computing device. For example, 'L' denomination is allocated to memory having memory between 256 GB and 2 TB. In this way, other sets of hardware components of the reference computing device may also be categorized. In the present example, the denominations S, M, and L may refer to a numeric value for the attribute of different hardware components.

In operation, the system 202 obtain the training information 208 from the repository 204 which may be further stored as training hardware configuration information 216 in the system 202. Once the training hardware configuration information 216 is obtained, the training attribute values 218 corresponding to the hardware components of the reference computing device are derived. Based on the derived attribute values, such as training attribute values 218, the training engine 212 may train the system classification model 214. Once trained, the system classification model 214 may be implemented as an ordered directed acyclic graph (referred to as acyclic graph). Example of such an acyclic graph may include plurality of nodes representing hardware types of the reference computing devices and connecting edges to form a logical path to a terminating node which represents a reference system software to be installed onto the computing device (which is explained in conjunction with FIG. 5). In an example, the logical paths represent different combinations of hardware components for different reference computing device and corresponding system software which needs to be installed.

Once the system classification model 214 is trained, it may be utilized for classifying the hardware components of the target computing device as one of a plurality of hardware types and installing a target system software onto the target computing device. For example, a hardware configuration information pertaining to a target computing device may be processed based on the system classification model 214. In such a case, based on the system classification model 214, the hardware components of the target computing device are classified as plurality of hardware types. A certain category of computing device may include a combination of hardware components. On determining the types of hardware components (i.e., on determining the combination of hardware components in the computing device), the category of the computing device under consideration may be determined. Once the category of the computing device is determined, the appropriate system software may be determined and installed on the computing device. The manner in which the hardware components of such a target computing device is classified by the trained system classification model 214 is further described in conjunction with FIG. 3.

Figure 3:
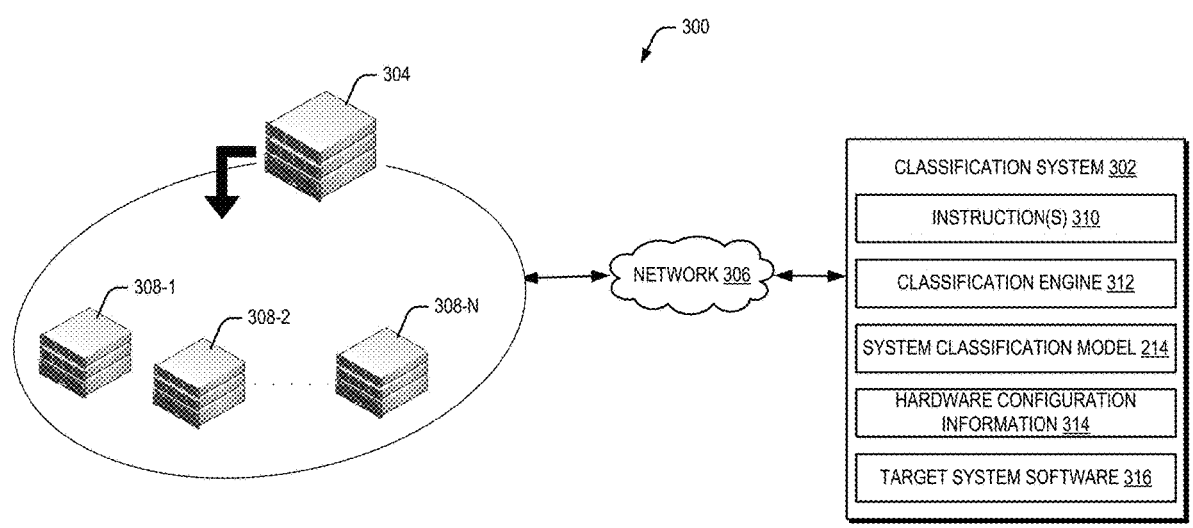
FIG. 3 illustrates a computing system for classifying hardware components a computing device, as per an example.

FIG. 3 illustrates a networked environment 300 with a classification system 302 (referred to as system 302), for determining the category to which a target computing device 304 may pertain to based on the classification of its hardware components. In an example, the system 302 may classify the hardware components of the target computing device 304 based on a trained system classification model, such as system classification model 214. The target computing device 304 may be a computing device which has been introduced within the networked environment 300 and is to be made operational. Examples of such a computing device include, but are not limited to, a desktop PC (Personal Computer), a laptop, a router, a switch, a storage system and many more.

In an example, the system 302 may be communicatively coupled to the target computing device 304 through a network 306. The network 306 may be a private network or a public network and may be implemented as a wired network, a wireless network, or a combination of a wired and wireless network, and may be similar to the network 206 (as depicted in FIG. 2). The networked environment 300 may further include other computing devices 308-1, 308-2, . . . , 308-N (collectively referred to as devices 308) which may already be functional within the environment 300.

Similar to the system 102 or 202, the system 302 may further include instructions 310 and a classification engine 312. In an example, the instructions 310 are fetched from a memory and executed by a processor included within the system 302. The classification engine 312 may be implemented as a combination of hardware and programming, for example, programmable instructions to implement a variety of functionalities. In examples described herein, such combinations of hardware and programming may be implemented in several different ways. For example, the programming for the classification engine 312 may be executable instructions, such as instructions 310. Such instructions may be stored on a non-transitory machine-readable storage medium which may be coupled either directly with the system 302 or indirectly (for example, through networked means). In an example, the classification engine 312 may include a processing resource, for example, either a single processor or a combination of multiple processors, to execute such instructions. In the present examples, the non-transitory machine-readable storage medium may store instructions, such as instructions 310, that when executed by the processing resource, implement classification engine 312. In other examples, the classification engine 312 may be implemented as electronic circuitry.

The system 302 may include a system classification model, such as the system classification model 214. The system 302 may further include a hardware configuration information 314 and a target system software 316. In an example, hardware configuration information 314 further includes attribute values corresponding to the hardware components of the target computing device 304. The target system software 316 is a system software which may be determined based on the hardware configuration information 314 of the target computing device 304 and needs to be installed onto the target computing device 304.

In operation, initially, the system 302 may obtain information pertaining to hardware components of the target computing device 304. The hardware related information is stored as hardware configuration information 314. Amongst other things, the hardware configuration information 314 may include attribute values, such as attribute values, of the different hardware components. For example, the attribute values of the hardware components may specify the number of processor cores, processor speed, memory size, number of Input/output ports, or graphical processing units (GPUs) types, that may be installed within the target computing device 304.

Once the hardware configuration information 314 is obtained, the attribute values pertaining to the hardware components of the target computing device 304 are derived. Using the derived attribute values, the classification engine 312 may classify the hardware components of the target computing device 304 as one of a plurality of hardware types based on the system classification model 214. In an example, a target computing device, such as target computing device 304, having attribute values pertaining to the hardware components, such as RAM size of 16 GB, 8 CPU cores, one network port and one GPU core, may communicate with the system 302. The system 302 obtain the hardware configuration information 314 of the device and derive the attribute values. Based on the derived attribute values, the classification engine 312 classify the hardware components of the target computing device 304 and categorize the target computing device 304 as one of the computing devices. Example of such computing devices include, but may not be limited to, a desktop PC, an Enterprise level computing system, and an IoT (Internet of Things) system.

Once the target computing device 304 is categorized as one of the computing devices, the classification engine 312 identifies a target system software, such as target system software 316, for the target computing device 304. For example, after classification of hardware components, if the target computing device 304 is categorized as Desktop PC, then the system 302 identifies target system software 318 appropriate for the Desktop PC and install the same onto the target computing device 304. In an example, the target system software 316 for each combination of hardware components are also included in the system classification model 214 while training. As would be understood, after installation, the target system software 316 enables the operation of the hardware components and the applications installed on the target computing device 304.

Although the present example depicts the system 302 to be directly coupled to the target computing device 304, the system 302 may be coupled to other intermediate server computing devices, such as PXE server in case of Preboot eXecution Environment, without deviating from the scope of the present subject matter.

Figure 4:
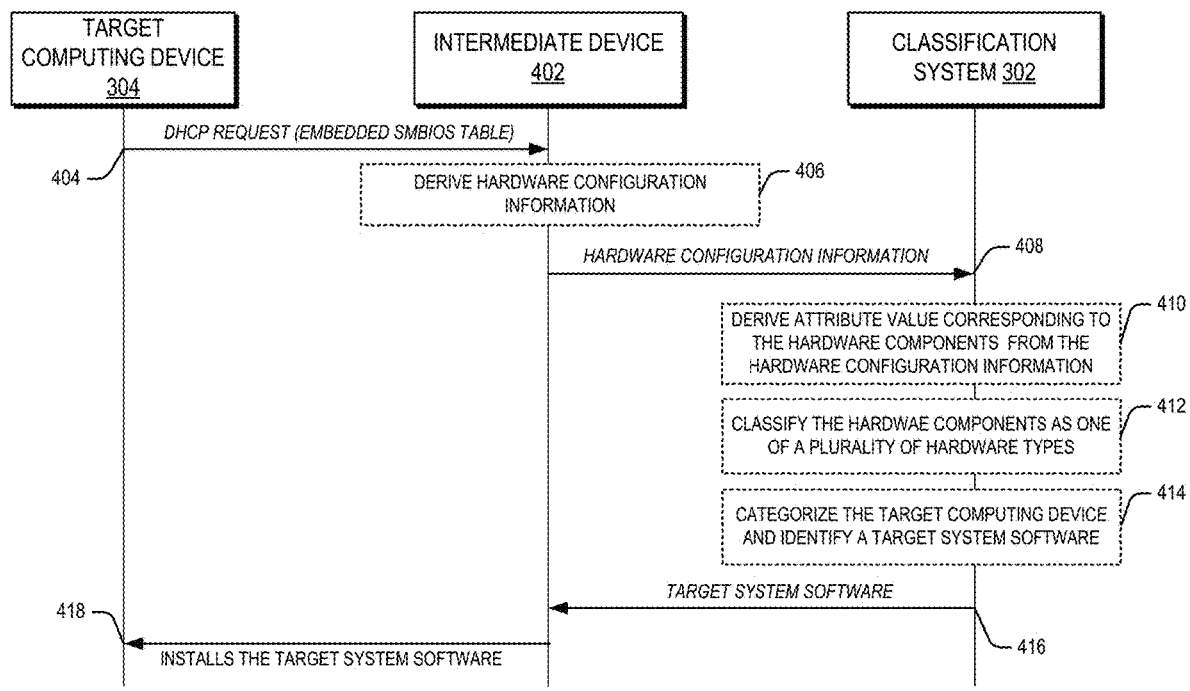
FIG. 4 illustrates a call flow diagram of communication between various computational systems within in a networked environment, as per an example.

FIG. 4 illustrates an example call flow diagram representing communication between various computational devices of a networked environment 300, as per one example. In the present context, the networked environment, such as networked environment 300, is implemented using Preboot Execution Environment (PXE). To this end, the networked environment 300 includes target computing device 304 which may be in communication with an intermediate device, such as a PXE server 402. The PXE server 402 in turn may be in communication with the system 302. It may be noted that the present example has been described in the context of a Preboot Execution Environment (PXE). Similar approaches may also be implemented for other environments without limiting the scope of the present subject matter.

As described previously, the target computing device 304 is the device which is deployed within a network, and onto which the appropriate system software is to be installed. According to FIG. 4, the target computing device 304 when deployed in the networked environment 300 may be detected by the PXE server 402. In an example, the target computing device 304 may initiate the installation of a system software by way of a DHCP (Dynamic Host Configuration Protocol) based request (as indicated by step 404). The DHCP based request may include information pertaining to the hardware components of the target computing device 304 in the form of a System Management BIOS (SMBIOS) table. Based on the SMBIOS table, the PXE server 402 may derive the information pertaining to the hardware configuration of the target computing device 304 (as indicated by step 406). The hardware configuration information (which is similar to the hardware configuration information 314) may then be transmitted to the system 302 (as indicated by step 408).

On receiving the hardware configuration information from the PXE server 402, the classification engine 312 may process the hardware configuration information to retrieve or derive attribute values corresponding to plurality of hardware components of the target computing device 304 (as indicated by step 410). Examples of such attribute values include, but are not limited to, processor cores, processor speed, memory size, number of network ports and many more. Based on the derived attribute values, the classification engine 312 may classify the hardware components associated with attribute values as one of a plurality of hardware types based on the system classification model, such as system classification model 214 (as indicated by step 412). In an example, the system classification model 214 may include an ordered directed acyclic graph, while traversing which, the classification engine 312 may compare the attribute value with a specification parameter linked with each hardware types to classify the hardware components of target computing device 304 (which may be explained in detail in conjunction with FIG. 5).

Once the hardware components of the target computing device 304 are classified, the system 302 may categorize the target computing device 304 as one of any computing device and identify a target system software, such as target system software 316, for installation onto the target computing device 304 (as indicated by step 414). In an example, the categorization of target computing device 304 may be based on the classification of the hardware components. Examples of such a target system software may include, but is not limited to, operating system, drivers and certain application software. Once the target system software 316 is identified, the system 302 may transmits the target system software 316 to the PXE server 402 (as indicated by step 416).

On receiving the target system software 316, the PXE server 402 transmits the received target system software 316 to the target computing device 304 for installation (as indicated by step 418). As would be understood, the target system software 316 enables the operation of the hardware components and the applications installed on the target computing device 304.

Figure 5:
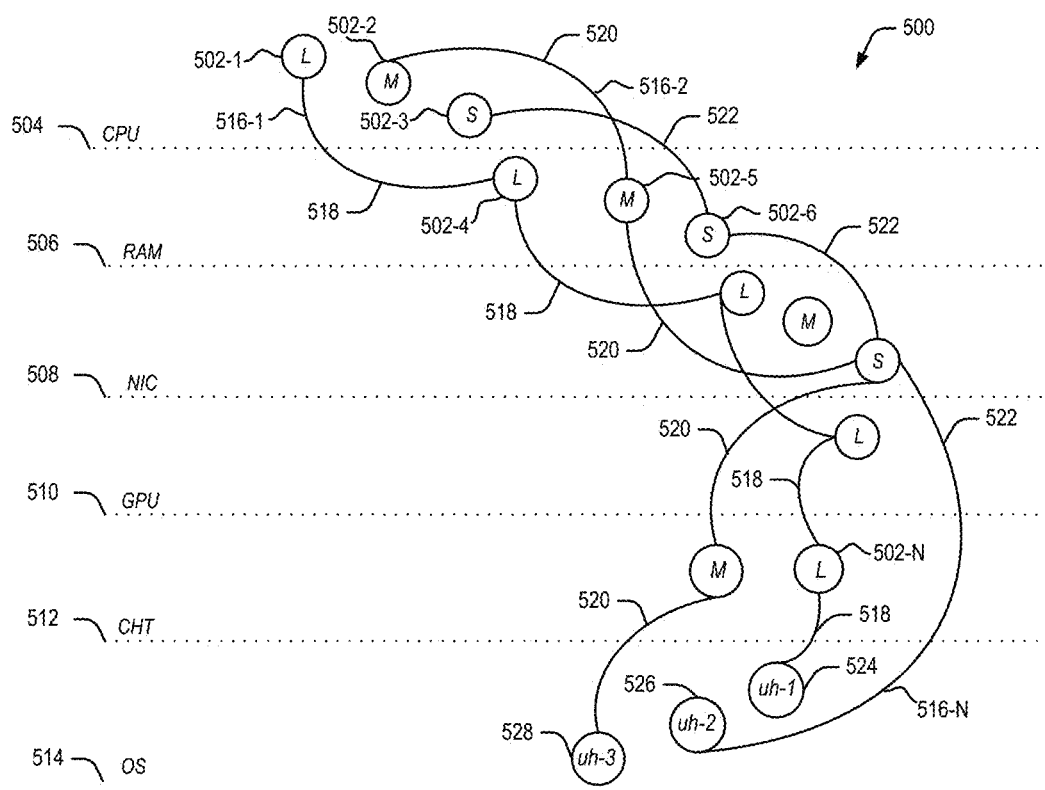
FIG. 5 illustrates an ordered directed acyclic graph of a system classification model, as per an example.

In one example, the system classification model 214 may be implemented in the form of an ordered graph. An example of such an ordered graph is depicted in FIG. 5. FIG. 5 illustrates an example ordered directed acyclic graph 500 (referred to as graph 500) corresponding to a trained system classification model, such as system classification model 214. In an example, the graph 500 includes plurality of nodes 502-1, 502-2, ..., 502-N (collectively referred to as the nodes 502). Each of the nodes 502 may represent attribute values of different types of hardware components. For example, nodes 502-1, 502-2, and 502-3, represent three classes (denoted by S, M, and L) of the processing unit (such as class 504) of a reference computing device. In a similar manner, nodes 502-4, 502-5, and 502-6 represent three classes (denoted by S, M, and L) of the memory of reference computing device (such as class 506).

In this way, other nodes 502 of the graph 500 may denote other classes of different hardware types, such as network interface cards (class 508), GPU (class 510), and custom hardware type (class 512). In the present example, the denomination S, M, and L may refer to a numeric value for the attribute value. For example, 'S' may refer to a numeric value which is less than the numeric value 'M', which in turn may be less than In this context, a processor in the class 'S' may have a number of cores which is less than the number of cores in class 'M'. Such a denomination may also represent the attribute value for other types of hardware components as well.

In an example, certain nodes 502 may be interconnected to each other through edges 516-1, 516-2 ..., N (collectively referred to as the edges 516). The edges 516 form logical paths (such as logical paths 518, 520 and 522) originating from one of the nodes 502 and is to depict a combination of hardware components (represented as one of the nodes 502) for a certain type of computing device. Each of the different logical paths (518, 520 and 522) may terminate at a terminating node (i.e., nodes 524, 526 and 528) which represents a unique hardware configuration type (denoted by uh-1, uh-2, and uh-3), and, type of system software (class 514) which may be installed on the computing device.

For determining the category to which a target computing device, such as the target computing device 304, the information pertaining to the hardware components of the target computing device 304 may be compared against each of the nodes 502. In an example, in purview of the categorization explained in Table 1, nodes 502-1, 2, and 3 belongs to the processing unit class (i.e., class 504) having cores between 32 to 256, 4 to 32, and 1 to 4, respectively. Similarly, nodes 502-4, 5, and 6 belongs to the memory class (i.e., class 506) having memory range between 256 GB to 2 TB, 8 GB to 256 GB, and 128 MB to 8 GB, respectively. In this way, nodes 502 of graph 500 are divided in classes representing different hardware components and each node of every class represents a range of attribute values to which that node belongs to.

Now, let's consider a target computing device, such as target computing device 304, having attribute values corresponding to hardware components, such as 48 core CPU, 526 GB RAM storage, 22 ports of NIC, 2 core GPU, and any visual device as custom hardware component. On processing such attributes value based on the system classification model 214, the classification engine 312 classifies the hardware components based on the attribute values of the different hardware components. In an example, in order to classify, the classification engine 312 may traverses the graph 500. During traversing graph 500, the attribute values of the target computing device 304 are compared against each of the nodes 502. For example, initially, the classification engine 312 compare the attribute value, i.e., 48 core CPU, against node 502-1, which is resulted in matched result because node 502-1 belongs to processing unit having cores between 32 to 256. Thereafter, the classification engine 312 jumps to other nodes of the subsequent class, i.e., class 506 representing memory, via edge 516-1 to node 502-4 and compare the subsequent attribute value, i.e., 526 GB RAM storage, against the node 502-4, which may again result in complete matching.

In this way, the classification engine 312 traverses the graph 500 until it reaches a terminating node. In context of the present example, traversed logical path is 518 and terminating node is 524 which may belong to an Enterprise level system. Thereafter, the classification engine 312 identifies the Enterprise level system software as the target system software 316 and installs the same onto the target computing device 304. In another example, while traversing, if any attribute values of target computing device 304 does not match with nodes 502, the system classification model 214 is subsequently trained to create an additional node corresponding to the hardware components which may be represented by the attribute value. The additional node may be further associated with other system software based on the combination of the hardware components of the reference computing device.

Figure 6:
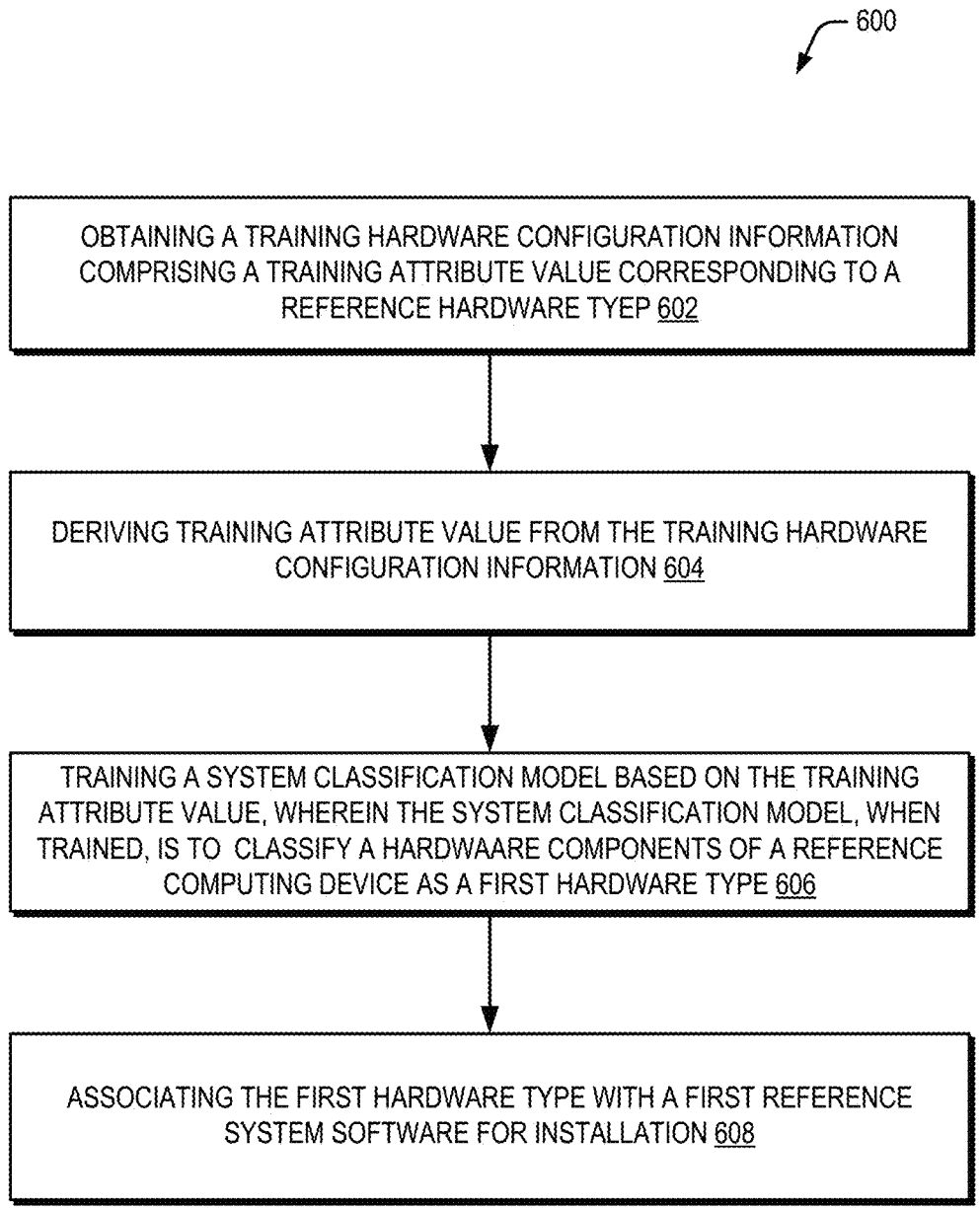
FIG. 6 illustrates a method for training a system classification model, as per an example.
Figure 7:
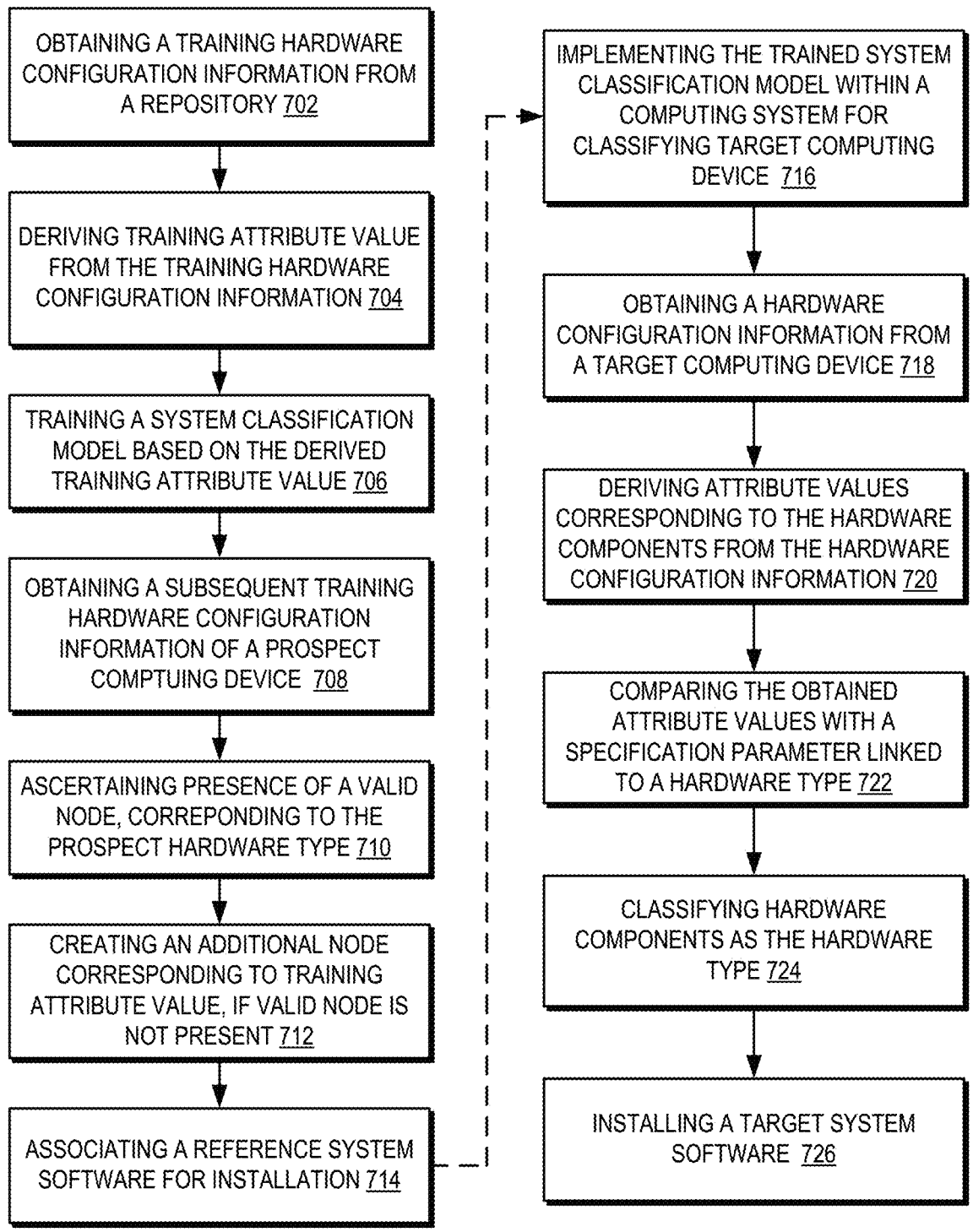
FIG. 7 illustrates a method for training a system classification model and classifying the hardware components of a target computing device, based on a trained system classification model, as per an example.

FIGS. 6-7 illustrate example methods 600-700 for training a system classification model and classifying the hardware components of a target computing device, in accordance with examples of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by a training system, such as system 202 and a classification system, such as system 302. In an implementation, the methods may be performed under an "as a service" delivery model, where the system 202 and the system 302, operated by a provider, receives programmable code. Herein, some examples are also intended to cover non-transitory computer readable medium, for example, digital data storage media, which are computer readable and encode computer-executable instructions, where said instructions perform some or all the steps of the above-mentioned methods.

In an example, the method 600 may be implemented by the system 202 for training the system classification model 214 based on a training information, such as training information 208. At block 602, the training information 208 including a training hardware configuration information, such as training hardware configuration information 216 and a reference system software, such as reference system software 220 is obtained. For example, the system 202 may obtain the training information 208 from the repository 204 over the network 206. The system 202 may obtain the training information 208 in response to execution of instructions 210. In an example, the training information 208 may pertains to the hardware configuration information of reference computing devices. The training information 208 may be stored as training hardware configuration information 216 and reference system software 220 in the system 202. As described previously, the training hardware configuration information 216 further includes training attribute values 218 corresponding to the hardware components of the reference computing device.

At block 604, a training attribute value is derived from the training hardware configuration information. For example, the training engine 212 may process the training hardware configuration information 216 to derive the training attribute values 218. In an example, the training engine 212 may obtain the training information 208 from the repository 204. In another example, the training engine 212 may also obtain training information 208 from a centralized server in a client-server environment, such as a Preboot execution Environment (PXE) server. The training information 208 in the PXE server may be stored as a SMBIOS specifications. The SMBIOS specification may include information in form of a data structure listing attribute values of hardware components of a computing device.

At block 606, a system classification model may be trained based on the derived attribute value. For example, on executing instructions 210, the training engine 212 trains the system classification model 214 based on the derived attribute values, such as training attribute values 218. In an example, the hardware component corresponding to the training attribute values 218 is classified as a first hardware type and a first specification parameter describing operation capability of first hardware type is linked with the first hardware type which may be utilized while classifying the hardware components of any computing device.

At block 608, a reference system software is associated with the hardware type. For example, the training engine 212 associates the reference system software 220 corresponding to the training hardware configuration information 216 of the reference computing device with the first hardware type. In an example, reference system software 220 corresponds to a system software for installing onto any computing device having hardware components similar to the combination of hardware components of the reference computing device.

In an example, once trained, the system classification model 214 may include an ordered directed graph, such as graph 500, including plurality of nodes 502 representing hardware type and connecting edges 516 to form logical paths, such as logical path 518, 520, and 522, which may be terminating to the terminating node, such as terminating node 524, 526, and 528. The terminating nodes represents appropriate system software for installation onto the target computing device 304. In another example, the system classification model 214 is subsequently trained based on subsequent training hardware configuration information comprising subsequent training attribute values corresponding to a prospect hardware type. The process of such subsequent training is further explained in conjunction with FIG. 7.

FIG. 7 illustrates another example method 700 for training a system classification model based on which hardware components of a target computing device may be classified, and accordingly a target system software is identified and installed on the target computing device. Based on the present approaches as described in the context of the example method 700, the hardware components of the target computing device are classified as plurality of hardware types, based on which a category of the computing device is ascertained, and a corresponding system software is identified and installed onto the target computing device. The present example method illustrates training of a system classification model and classifying hardware components of a target computing device, based on such a trained system classification model. It is pertinent to note that such training and eventual analysis of log files may not occur in continuity and may be implemented separately without deviating from the scope of the present subject matter.

At block 702, a training hardware configuration information of a reference computing device is obtained from a repository. For example, the system 202 may obtain the training information 208 from a storage area, such as a repository 204 over a network 206. The system 202 may obtain the training hardware configuration information 216 in response to execution of instructions 210. The training information 208 may be stored as training hardware configuration information 216 and reference system software 220 in the system 202. In an example, the training hardware configuration information 216 may further include training attribute values 218 corresponding to the hardware components of the reference computing device.

At block 704, a training attribute values are derived from the obtained hardware configuration information. For example, a training engine 212 may process the obtained training hardware configuration information 216 to derive training attribute values and store them as training attribute values 218. In an example, the training hardware configuration information 216 may be obtained based on a data structure, such as SMBIOS specification, which may be produced during hardware initialization of the reference computing device.

At block 706, a system classification model is trained based on the derived attribute values. For example, a training engine 212, in response to execution of instructions 210, trains the system classification model 214 based on the derived attribute values, such as training attribute values 218. In an example, while training, the hardware component corresponding to the training attribute values 218 is classified as a first hardware type and a first specification parameter describing operation capability of first hardware type is linked with the first hardware type. In an example, once trained, the system classification model 214 may include an ordered directed acyclic graph, which may include plurality of nodes representing hardware types and connected edges to form a logical path representing a combination of hardware components based on the training attribute values of the reference computing device.

At block 708, a subsequent training hardware configuration information including a training attribute values corresponding to a prospect computing device is obtained from the repository. For example, training engine 212 may obtain the subsequent training hardware configuration information, such as training hardware configuration information 216, from a repository 204 over a network 206. In an example, the system 202 may process the training hardware configuration information 216 to obtain the training attribute values 218.

At block 710, presence of a valid node in the ordered directed acyclic graph is ascertained. For example, the training engine 212 may process the derived training attribute values 218 on a trained system classification model including graph 500 to ascertain presence of the valid node, i.e., presence of node corresponding to the prospect hardware type is ascertained.

At block 712, an additional node corresponding to the training attribute values is created. For example, the training engine 212, on determining that the valid node is not present, creates an additional node corresponding to the training attribute values 218. In an example, the additional nodes may relate to the hardware components corresponding to the training attribute values 218.

At block 714, a reference system software is associated with the created node. For example, the training engine 212 may associates a second reference system software, such as reference system software 220, with the created additional node. In an example, these additional nodes may also be created and associated with reference system software while classifying the hardware components of a target computing device using system 302.

At block 716, the trained system classification model is implemented within a computing system for classifying hardware components of a target computing device. For example, once the system classification model 214 is trained, it may be utilized for analyzing hardware components of the target computing device 304 to determine a target system software 318 for installation onto the target computing device 304. Although block 716 is depicted as following block 714, the system classification model 214 may be implemented separately without deviating from the scope of the present subject matter.

At block 718, a hardware configuration information is obtained from a target computing device. For example, the system 302 may obtain the hardware configuration information 314 from the target computing device 304 over the network 306. In an example, the hardware configuration information 314 may include plurality of attribute values corresponding to the hardware components of the target computing device 304. In another example, in Preboot eXecution environment, the system 302 may obtain hardware configuration information 314 of the target computing device from an intermediate device, such as PXE server 402.

At block 720, attribute values are derived from the obtained hardware configuration information. For example, the classification engine 312 may derive the attribute values from the hardware configuration information 314. In an example, attribute values describe hardware information pertaining to the hardware components of the target computing device 304.

At block 722, attribute values are compared with a specification parameter linked with a hardware type. For example, the classification engine 312 may compare the derived attribute values with the specification parameter linked with the hardware type. In an example, the attribute values are compared with the numeric identifiers associated with the nodes 502 of the graph 500, to ascertain the presence of the valid node in graph 500.

At block 724, hardware components associated attribute values are classified as one of a plurality of hardware types. For example, classification engine 312 classify the hardware components represented by attribute values of target computing device 304 as one of plurality of hardware types. In an example, once the hardware components of the target computing device 304 are classified, the classification engine 312 further categorize the target computing device 304 as one of a computing device. Examples of such computing devices include, but may not be limited to, Desktop PC, Enterprise level system and IOT based system.

At block 726, a target system software is installed onto the target computing device. For example, the classification engine 312 may identify the target system software 316 based on the categorization of the target computing device 304 which in turn may be based on the classification of the hardware components of the target computing device 304, and installs the target system software 316 onto the target computing device 304. In an example, in Preboot eXecution Environment, such as networked environment 300, the system 302 may transmits the identified target system software 316 to an intermediate device, such as PXE server 402, which in turn installs target system software 316 onto the target computing device 304.

Figure 8:
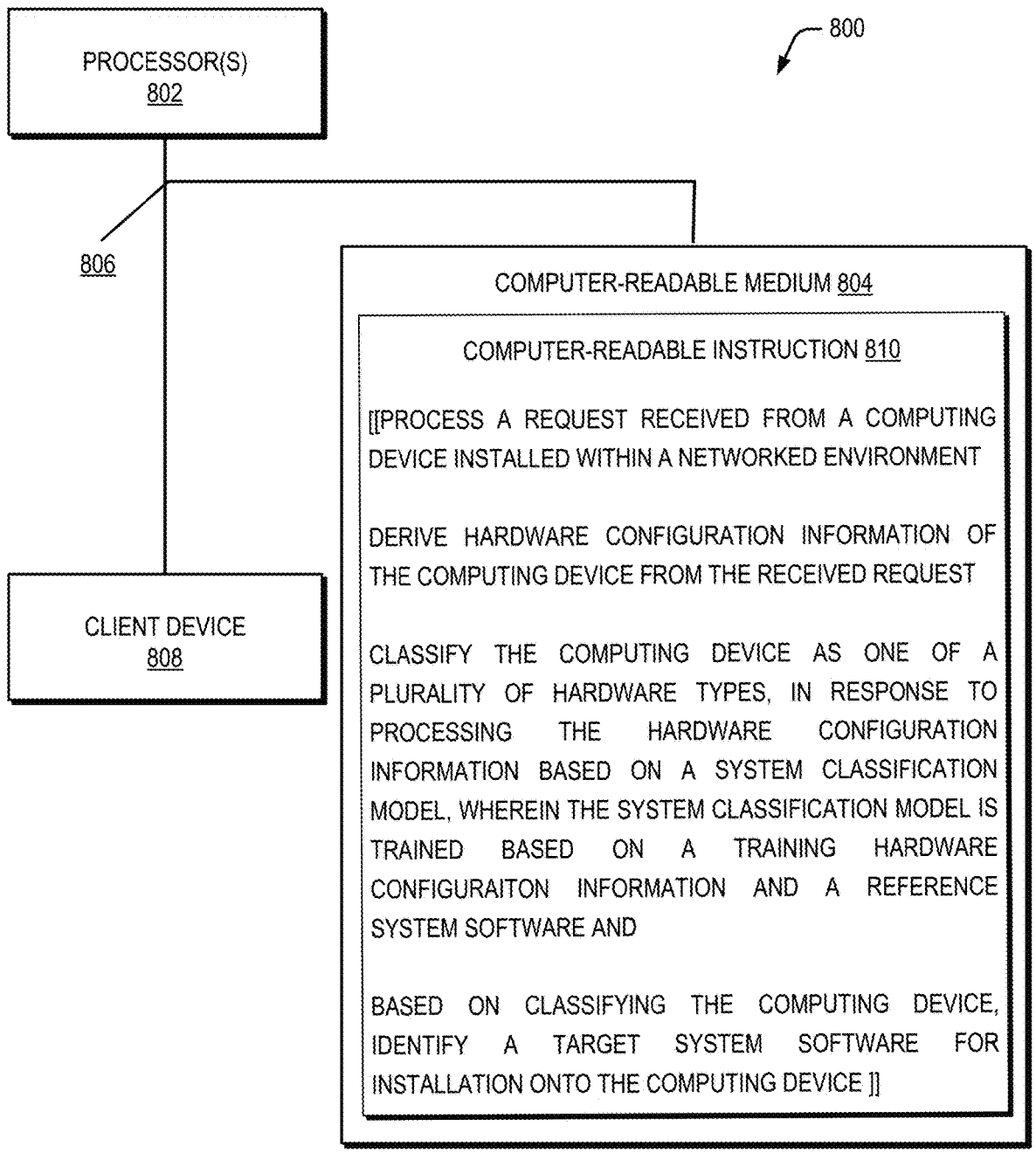
FIG. 8 illustrates a system environment implementing a non-transitory computer readable medium for classifying hardware components of a target computing device, based on a trained system classification model, as per an example.

FIG. 8 illustrates a computing environment 800 implementing a non-transitory computer readable medium for classifying the hardware components of the computing device as one of a plurality of hardware types based on a system classification model. In an example, the computing environment 800 includes processor(s) 802 communicatively coupled to a non-transitory computer readable medium 804 through a communication link 806. In an example implementation, the computing environment 800 may be for example, the system 302. In an example, the processor(s) 802 may have one or more processing resources for fetching and executing computer-readable instructions from the non-transitory computer readable medium 804. The processor(s) 802 and the non-transitory computer readable medium 804 may be implemented, for example, in system 302 (as has been described in conjunction with the preceding figures).

The non-transitory computer readable medium 804 may be, for example, an internal memory device or an external memory device. In an example implementation, the communication link 806 may be a network communication link. The processor(s) 802 and the non-transitory computer readable medium 804 may also be communicatively coupled to a computing device 808 over the network.

In an example implementation, the non-transitory computer readable medium 804 includes a set of computer readable instructions 810 which may be accessed by the processor(s) 802 through the communication link 806. Referring to FIG. 8, in an example, the non-transitory computer readable medium 804 includes instructions 810 that cause the processor(s) 802 to process a request, such as a DHCP based request (as described in conjunction with FIG. 4) received from a computing device, such as target computing device 304. Such DHCP based request may include a hardware configuration information, such as hardware configuration information 314, embedded in the request. In one example, the DHCP based request is initiated by the target computing device 304 while operating in a Preboot eXecution Environment (PXE).

Once the DHCP based request is received, the instructions 810 may cause the processor(s) 802 to derive the hardware configuration information 314 from the received DHCP based request. In an example, the received DHCP based request may include an embedded hardware configuration information 314, e.g., embedded in options section of the DHCP based request. In one example, the derived hardware configuration information 314 may further include attribute values corresponding to the plurality of hardware components of the target computing device 304.

The instructions 810 may be further executed to cause the processor(s) 802 to classify the hardware components of the target computing device 304 as one of a plurality of hardware types by processing the attribute values of hardware configuration information 314 based on a system classification model, such as system classification model 214. In an example, the system classification model 214 may include an ordered directed acyclic graph, such as graph 500, comprising a plurality of nodes 502 representing a hardware type and connected edges 516 to form logical paths, such as logical paths 518, 520, and 522, which may be terminating to the terminating nodes, such as node 524, 526 and 528. Such defined logical paths depict a combination of hardware components of different hardware types and the terminating nodes represents a system software operating system for installing onto the target computing device 304 which requests for the same using the DHCP based request.

In an example, while classifying the hardware components, the instructions 810 may be executed to cause the processor(s) 802 to compare the attribute values of corresponding hardware components with a specification parameter including in the system classification model 214. In an example, each node representing one of a reference hardware types of the reference computing device is linked with a specification parameter. Based on determining that the attribute values match with the specification parameter, the hardware components of the target computing device 304 are classified as the corresponding hardware types which is linked with the specification parameter. Thereafter, once the hardware components are classified, a category of the target computing device 304 is determined based on the classification of the hardware component, and a target system software, such as target system software 316 is identified and installed onto the target computing device 304.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:
a processor; and
a non-transitory machine-readable storage medium comprising instructions executable on the processor to:
obtain hardware configuration information of a target computing device installed within a networked environment, the hardware configuration information comprising attribute values including a first attribute value for a first type of hardware component in the target computing device, and a second attribute value for a second type of hardware component in the target computing device, the second type of hardware component different from the first type of hardware component;

process the attribute values in the hardware configuration information based on a system classification model to classify hardware components of the target computing device to identify a first class from among multiple classes of the first type of hardware component, and identify a second class from among multiple classes of the second type of hardware component, wherein the system classification model is trained based on training hardware configuration information and a reference system software; and based on classifying the hardware components of the target computing device that identifies the first class of the first type of hardware component, and that identifies the second class of the second type of hardware component, identify, using the system classification model, a target system software that is for a computing device having a combination of hardware components including the first class of the first type of hardware component and the second class of the second type of hardware component; and cause installation of the target system software onto the target computing device.

2. The system of claim 1, wherein the attribute values comprise one or more of:
a first attribute value specifying a number of processor cores, or
a second attribute value specifying a memory size, or
a third attribute value specifying a number of network ports.

3. The system of claim 1, wherein the reference system software is installed in a reference computing device for which the training hardware configuration information is obtained.

4. The system of claim 1, wherein to process the attribute values of the hardware configuration information, the instructions are executable on the processor to:
compare a first attribute value pertaining to a first hardware component of the computing device to a specification parameter; and
in response to determining that the first attribute value matches the first specification parameter, classify the first hardware component as the first class of the first type of hardware component.

5. The system of claim 4, wherein the specification parameter is represented by a node of an ordered graph comprising a plurality of nodes representing different classes of different types of hardware components.

6. The system of claim 1, wherein the system classification model comprises an ordered directed acyclic graph comprising a plurality of nodes, each node of the plurality of nodes representing a hardware type, and multiple nodes of the plurality of nodes are connected by edges to form a first logical path to a terminating node, wherein the first logical path represents a combination of hardware components of different hardware types.

7. The system of claim 6, wherein the terminating node corresponds to a first reference system software for installing onto a reference computing device having hardware components corresponding to the combination of hardware components of the different hardware types represented by the first logical path.

8. The system of claim 6, wherein a first node of the plurality of nodes represents the first class of the first type of hardware component, and a second node of the plurality of nodes represents a different class of the first type of hardware component.

9. The system of claim 8, wherein the first logical path comprises the first node and another node representing the second class of the second type of hardware component.

10. The system of claim 1, wherein the hardware configuration information is from a server computing device implementing a Preboot eXecution Environment (PXE) specification.

11. A method of a system comprising a hardware processor, comprising:
obtaining training hardware configuration information comprising a training attribute value corresponding to a reference hardware type;
deriving the training attribute value from the training hardware configuration information;
training a system classification model based on the training attribute value, wherein the system classification model, when trained, is to classify a hardware component of a reference computing device as a first hardware type, wherein the system classification model is to implement an ordered directed acyclic graph comprising a plurality of nodes, each node of the plurality of nodes representing a hardware type and multiple nodes of the plurality of nodes are connected by edges to form a first logical path to a terminating node, wherein the first logical path represents a combination of hardware components of different hardware types;
associating the first hardware type with a first reference system software for installation onto a target computing device;
obtaining further training hardware configuration information comprising a further attribute value corresponding to a prospect hardware type;
traversing the ordered directed acyclic graph to ascertain whether any node from the plurality of nodes corresponds to the prospect hardware type;
in response to determining that the prospect hardware type does not correspond to any of the nodes from the plurality of nodes, creating an additional node corresponding to the prospect hardware type; and
associating the prospect hardware type with a second reference system software for installation.

12. The method of claim 11, wherein the reference hardware type comprises one of motherboard type, a system enclosure type, a processor type, a memory controller type, a system slot type, a pointing device type, a power source type, a cooling device type, or a management device type.

13. The method of claim 11, wherein the training hardware configuration information is based on a data structure comprising information produced during hardware initialization of the reference computing device.

14. The method of claim 13, wherein the data structure is according to a System Management BIOS (SMBIOS) specification.

15. The method of claim 11, comprising adding the additional node to the ordered directed acyclic graph.

16. A non-transitory computer-readable medium comprising instructions that are executable by a processing resource to:
process a request received from a target computing device installed within a networked environment;
obtain hardware configuration information of the target computing device based on the request, the hardware configuration information comprising attribute values including a first attribute value for a first type of hardware component in the target computing device, and a second attribute value for a second type of hardware component in the target computing device, the second type of hardware component different from the first type of hardware component;

process the attribute values in the hardware configuration information based on a system classification model to classify hardware components of the target computing device to identify a first class from among multiple classes of the first type of hardware component, and identify a second class from among multiple classes of the second type of hardware component, wherein the system classification model is trained based on training hardware configuration information and a reference system software;

based on classifying the hardware components of the target computing device that identifies the first class of the first type of hardware component, and that identifies the second class of the second type of hardware component, identify, using the system classification model, a target system software that is for a computing device having a combination of hardware components including the first class of the first type of hardware component and the second class of the second type of hardware component; and cause installation of the target system software onto the target computing device.

17. The non-transitory computer-readable medium of claim 16, wherein the system classification model comprises a directed graph comprising a plurality of nodes, each node of the plurality of nodes representing a hardware type and multiple nodes of the plurality of nodes connected by edges to form a first logical path to a terminating node, wherein the first logical path represents a combination of hardware components of different hardware types.

18. The non-transitory computer-readable medium as claimed in claim 17, wherein the terminating node represents an operating system for installing onto a reference computing device.

19. The non-transitory computer-readable medium of claim 17, wherein a first node of the plurality of nodes represents the first class of the first type of hardware component, and a second node of the plurality of nodes represents a different class of the first type of hardware component, and wherein the first logical path comprises the first node and another node representing the second class of the second type of hardware component.

20. The non-transitory computer-readable medium of claim 17, wherein the instructions are executable by the processing resource to:

obtain further training hardware configuration information comprising a further attribute value corresponding to a prospect hardware type;

traverse the directed graph to ascertain whether any node from the plurality of nodes corresponds to the prospect hardware type;

in response to determining that the prospect hardware type does not correspond to any of the nodes from the plurality of nodes, create an additional node corresponding to the prospect hardware type;

add the additional node to the directed graph; and associate the prospect hardware type with a second reference system software for installation.

\* \* \* \* \*